Aug. 26, 1969  D. W. HODGSON  3,463,512
FIFTH WHEEL CONSTRUCTION
Filed Oct. 31, 1967
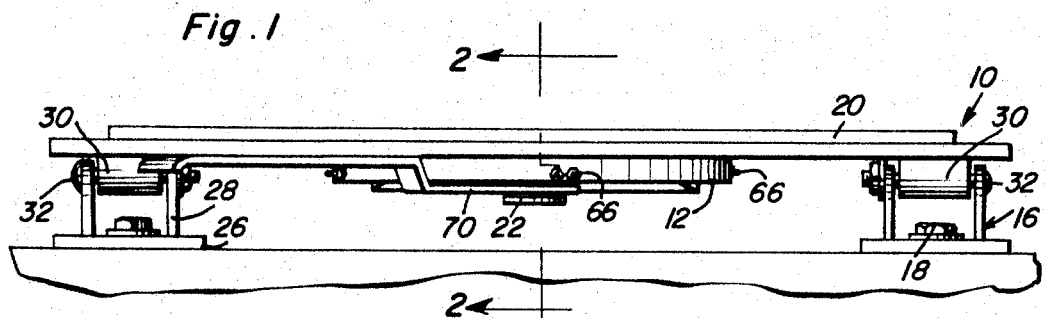
Fig. 1
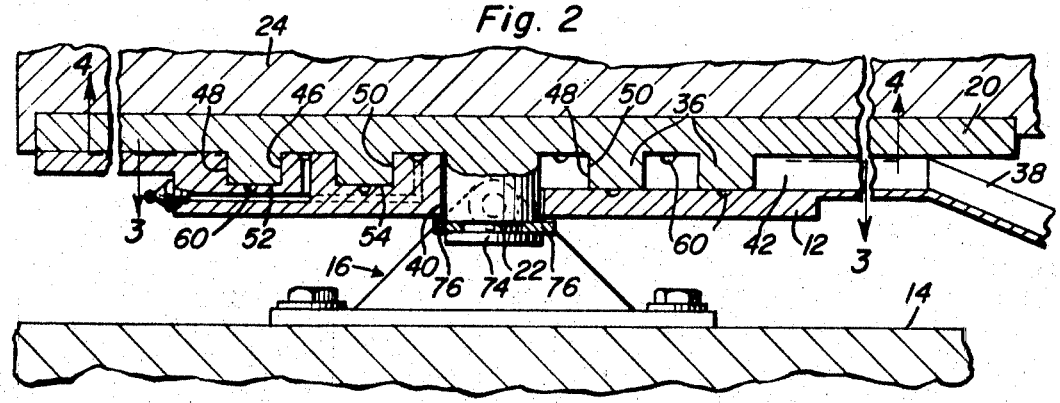
Fig. 2
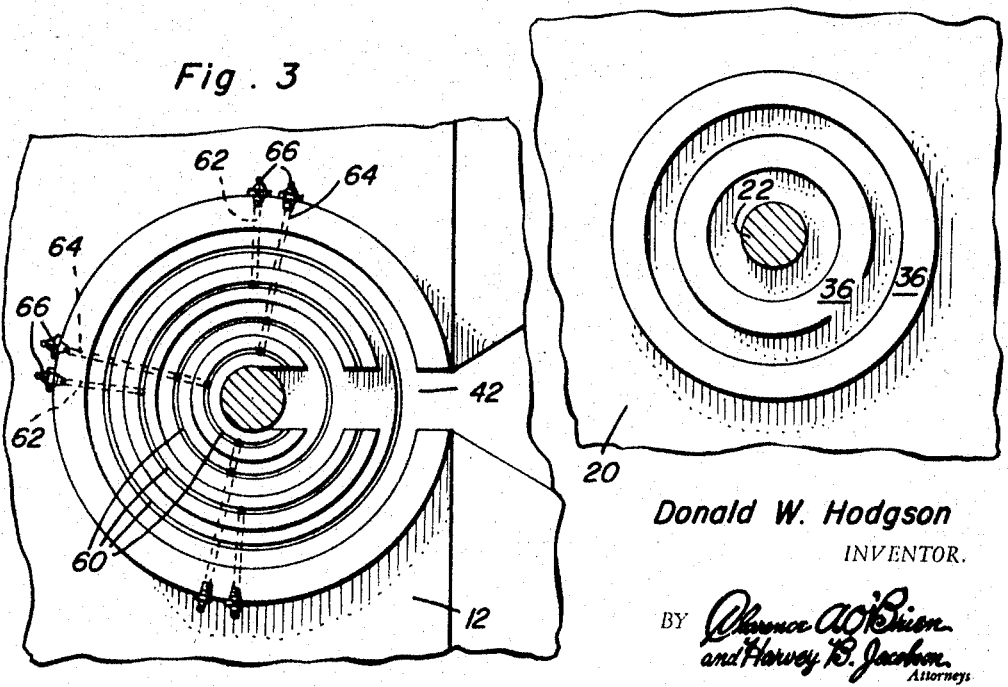
Fig. 3
Fig. 4
Donald W. Hodgson
INVENTOR.
BY Clarence A. O'Brien
and Harvey B. Jacobson
Attorneys United States Patent Office 3,463,512
Patented Aug. 26, 1969

3,463,512
FIFTH WHEEL CONSTRUCTION
Donald W. Hodgson, 1646 10th St.,
Arcata, Calif. 95521
Filed Oct. 31, 1967, Ser. No. 679,482
Int. Cl. B60d 53/06
U.S. Cl. 280—432    7 Claims

ABSTRACT OF THE DISCLOSURE

First and second plates for securement to a semitrailer and tractor, respectively, or alternatively to a tractor and semitrailer, respectively, the first plate having a plurality of concentric circular grooves opening outwardly of one side thereof and second plate including a plurality of concentric circular ridges projecting outwardly of one side thereof with the ridges snugly receivable within the grooves and the opposing side surfaces of the ridges and the grooves defining coacting bearing surfaces journalling the plates from each other for relative oscillation about an axis concentric with the ridges and the grooves. One of the plates is provided with a fifth wheel pin projecting outwardly thereof and the other of the plates includes a bore concentric with the grooves and which the pin is rotatably and axially slidably received, means being provided to releasably engage the pin to prevent its axial withdrawal from the bore and to thereby maintain the ridges nested within the grooves.

---

The fifth wheel construction is contemplated as a means for more efficiently transferring the driving thrust of a tractor to an associated semitrailer. The fifth wheel construction includes coacting bearing surfaces for transferring this driving thrust which are many times greater in area than the conventional bearing surfaces provided by only a conventional fifth wheel pin and cooperating portions of a conventional fifth wheel plate. In addition, the fifth wheel construction includes cooperating bearing surfaces thereof utilized to transfer driving thrust from the tractor to the semitrailer portion which may be readily lubricated and maintained in a lubricated state. Further, a conventional fifth wheel pin is usually disposed in shear and the fifth wheel construction is constructed in a manner such that the pin portion thereof is maintained out of shear to thereby greatly reduce the possibility of the pin being sheared.

The main object of this invention is to provide a fifth wheel construction including cooperating journal bearing surfaces operable to transfer the driving thrust of a tractor to a semitrailer and which have a total area considerably greater than the bearing surface area of a conventional fifth wheel pin and fifth wheel plate.

Another object of this invention is to provide a fifth wheel cnstruction which will include a conventional fifth wheel pin but which will maintain the fifth wheel pin out of shear and thereby completely eliminate shear forces acting thereon.

A still further object of this invention is to provide a fifth wheel construction including structural features thereof enabling the bearing surfaces formed thereby to be readily lubricated and maintained in a lubricated condition.

A final object of this invention to be specifically enumerated herein is to provide a fifth wheel construction which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of a fifth wheel assembly constructed in accordance with the present invention;

FIGURE 2 is an enlarged fragmentary vertical sectional view taken substantially upon the plane indicated by the section line 2—2 of FIGURE 1;

FIGURE 3 is a fragmentary horizontal sectional view taken substantially upon the plane indicated by section line 3—3 of FIGURE 2; and FIGURE 4 is a fragmentary horizontal sectional view taken substantially upon the plane indicated by section line 4—4 of FIGURE 2.

Referring now more specifically to the drawings the numeral 10 generally designates a fifth wheel structure in accordance with the present invention. The fifth wheel 10 includes a lower plate 12 pivotally supported from a tractor or truck 14 by means of a pair of journal block assemblies generally referred to by the reference numeral 16 from which the lower plate 12 is oscillatably supported and which is secured to the tractor 14 by means of suitable fasteners 18. The fifth wheel 10 also includes an upper plate 20 including a downwardly projecting fifth wheel pin 22 and which is supported from the forward end portion of a semitrailer type vehicle 24 in any convenient manner.

The journal block assemblies 16 each include a base plate 26 and a pair of parallel upstanding plates 28 between which the sleeve portions 30 dependingly supported from the lower plate 12 are pivoted by means of suitable pivot fasteners 32. The upper plate 20 includes a plurality of depending concentric ridges 36 concentrically disposed about the fifth wheel pin 22 and which are of a vertical extent equal to approximately one-half the vertical extent of the pin 22.

The lower plate 12 includes a rear end portion 38 which is rearwardly and downwardly beveled and includes a concentric upstanding bore downwardly through which the fifth wheel pin 22 is receivable. The lower plate 12 includes a generally radial groove or channel 42 whose inner end opens into the bore 40 and whose outer end is inclined downwardly and extends rearwardly along the rear end portion 38 so as to define a centering ramp for the lower extremity of the pin 22 leading upwardly to the horizontal inner end portion of the groove 42. In addition, the lower plate 12 includes a plurality of grooves 46 concentrically disposed about the bore 40, and whose bottom surfaces are coplanar with the bottom surface of the groove 42.

The ribs 36 are snugly received within the grooves 46 when the plates 12 and 20 are positioned as illustrated in FIGURE 2 of the drawings and the side surfaces 48 of the ridges 36 and the opposing side surfaces 50 of the grooves 46 define coacting journal bearing surfaces which are operative to transfer all driving thrusts of the tractor 14 to the semitrailer 24 thus maintaining the fifth wheel pin 22 out of shear relation.

Of course, the bottom surfaces 52 and the confronting surfaces 54 of the ridges 36 define sets of thrust bearing surfaces coacting with each other to provide antifriction thrust bearing portions. In addition, the under surface portions of the upper plate 20 disposed between the ridges 36 and the upper surface portions of the lower plate 12 disposed between the grooves 46 also define sets of thrust bearing surfaces coacting with each other to provide antifriction thrust bearing portions.

The bottom surfaces 52 and the upper surface portions of the lower plate 12 disposed between the grooves 46 and also between the smallest groove 46 and the bore 40 include shallow concentric lubricating material grooves 60 and the lower plate 12 includes pairs of short and long generally radial passages 62 and 64 having lubricating fittings 66 secured in their outermost ends and which open upwardly into the outer and inner pairs of grooves 62, respectively, at their radial inner ends. The sets of radial passages 62 and 64 are spaced circumferentially about the lower plate 12 and therefore it may be seen that substantially all of the thrust bearing surfaces and journal bearing surfaces of the fifth wheel construction may be readily lubricated and points spaced therealong by means of the lubricating material passages 62 and 64 and the grooves 60 into which the passages 62 and 64 open.

It will of course be noted that the vertical extent of the ridges 36 is substantially identical to the depth of the grooves 46. Further, any suitable means such as forked locking rod 70 may be mounted on the lower plate 12 and shiftable into position, the grooved end 74 of the fifth wheel pin 22 received between the furcations 76 of the bifurcated end of the rod 70 so as to prevent axial withdrawal of the fifth wheel pin 22 from the bore 20 and thus axial withdrawal of the ridges 36 from the grooves 46. Any suitable means may be utilized to support the rod 70 from the lower plate 12 and if it is desired, means other than the forked rod 70 may be utilized to rotatably engage and releasably retain the lower end portion of the fifth wheel pin 22 through the bore.

The top plate 20 rests fully on the lower plate 12 whereby the opposing surfaces of these plates also serve as thrust bearing surfaces and the chances of dust and water seeping into the grooves 46 will be reduced. Further, the forked rod 70 is spaced only approximately .01 inch below the bottom plate 12 whereby substantially all axial shifting of the pin 22 relative to the bottom plate 12 is eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fifth wheel construction including a first plate having a plurality of concentric circular grooves opening outwardly of one side of said first plate, a second plate including a plurality of concentric circular ridges projecting outwardly of one side of said second plate and snugly receivable in said grooves with opposing side surfaces of said ridges and grooves defining coacting bearing surfaces journaling said plates from each other for relative oscillation about an axis concentric with said ridges and grooves, one of said plates including a fifth wheel pin projecting outwardly of said one side thereof concentric with said axis and the other of said plates including a bore also concentric with said axis in which said pin is rotatably and axially slidably received, and means operative to releasably engage said pin to prevent its axial withdrawal from said bore, said other plate including an elongated entrance channel opening toward said one plate and extending generally radially of said axis, the inner end of said channel opening into said bore and the free end portion of said pin being slidable through said channel for guided movement into registry with said bore, the outer end portion of said entrance channel, outwardly of said circular grooves and ridges, being outwardly inclined away from said one plate, the outer end of said pin being slidable along the inclined bottom of the outer end portion of said channel toward the inner end portion of the channel and the pin, when seated in the inner end portion of said entrance channel, serving to maintain said plates in spaced relation with said ridges axially displaced at least slightly outwardly from the surface of said first plate through which said grooves open.

2. The combination of claim 1 wherein said ridges are carried by said one plate and said circular grooves are formed in said other plate.

3. The combination of claim 1 wherein the bottom surfaces of said grooves and the confronting surfaces of said ridges define sets of thrust bearing surfaces coacting with each other to provide antifriction thrust bearing portions.

4. The combination of claim 3 wherein a first of said plates includes lubricating material passages including one set of corresponding ends opening through the corresponding thrust bearing surfaces and a second set of corresponding ends adapted to have lubricating material forced thereinto.

5. The combination of claim 1 wherein said means operative to releasably engage said pin includes means carried by said other plate and rotatably engageable with said pin.

6. The combination of claim 1 wherein said ridges are carried by said one plate and said circular grooves are formed in said other plate, the bottom surfaces of said grooves and the confronting surfaces of said ridges defining sets of thrust bearing surfaces coacting with each other to provide antifriction thrust bearing portions.

7. The combination of claim 6 wherein a first of said plates includes lubricating material passages including one set of corresponding ends opening through the corresponding thrust bearing surfaces and a second set of corresponding ends adapted to have lubricating material forced thereinto.

References Cited

UNITED STATES PATENTS

| | | | |
|---|---|---|---|
| 2,959,429 | 11/1950 | Lavelle | 280—432 |
| 3,000,653 | 9/1961 | Wood | 280—433 |
| 3,011,798 | 12/1961 | Gates | 280—433 X |
| 3,146,040 | 8/1964 | Gist | 280—433 X |
| 3,275,340 | 9/1966 | Sancioni | 280—432 |
| 3,325,185 | 6/1967 | Higby | 280—432 |

LEO FRIAGLIA, Primary Examiner

U.S. Cl. X.R.

280—116, 433; 308—222